UNITED STATES PATENT OFFICE.

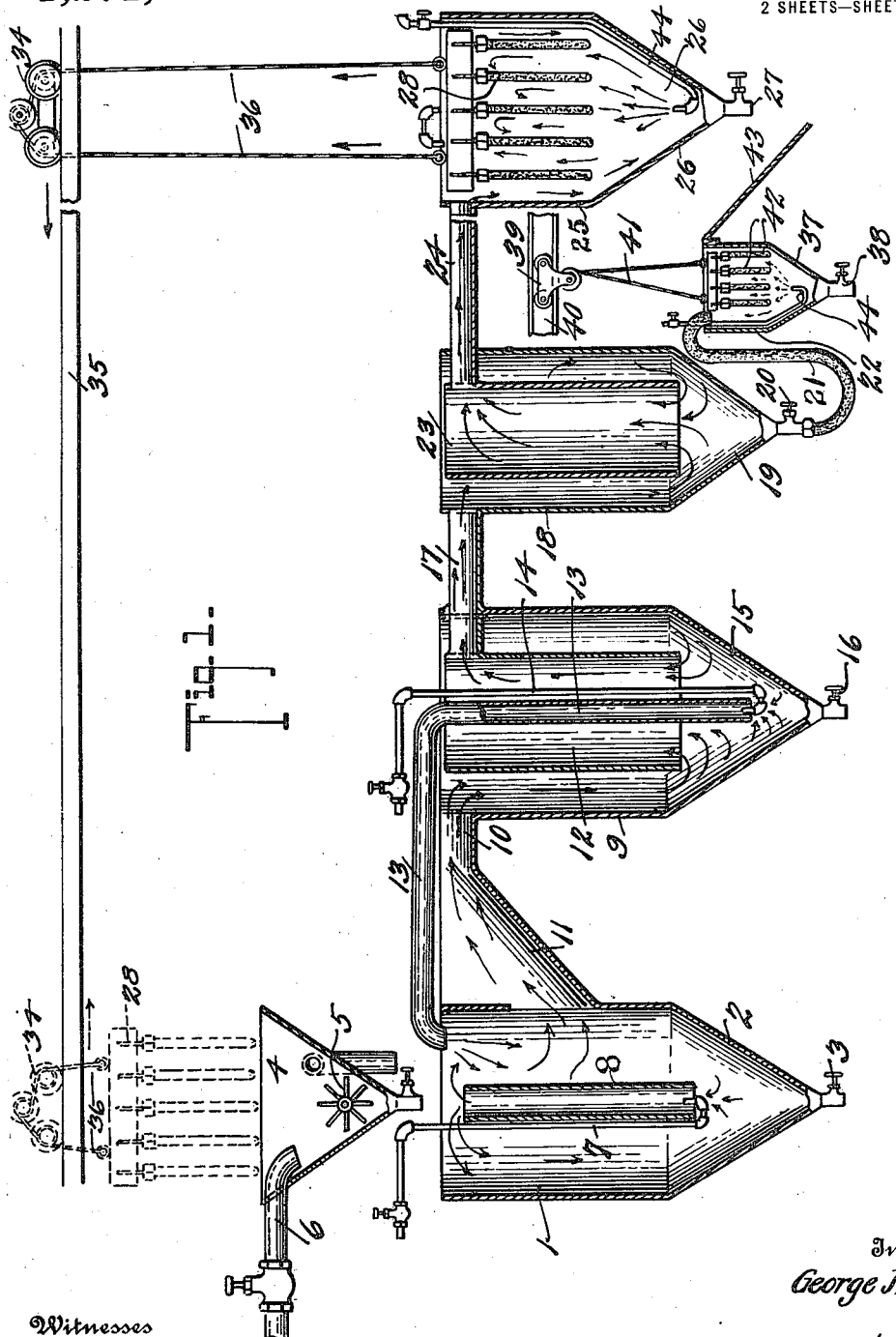

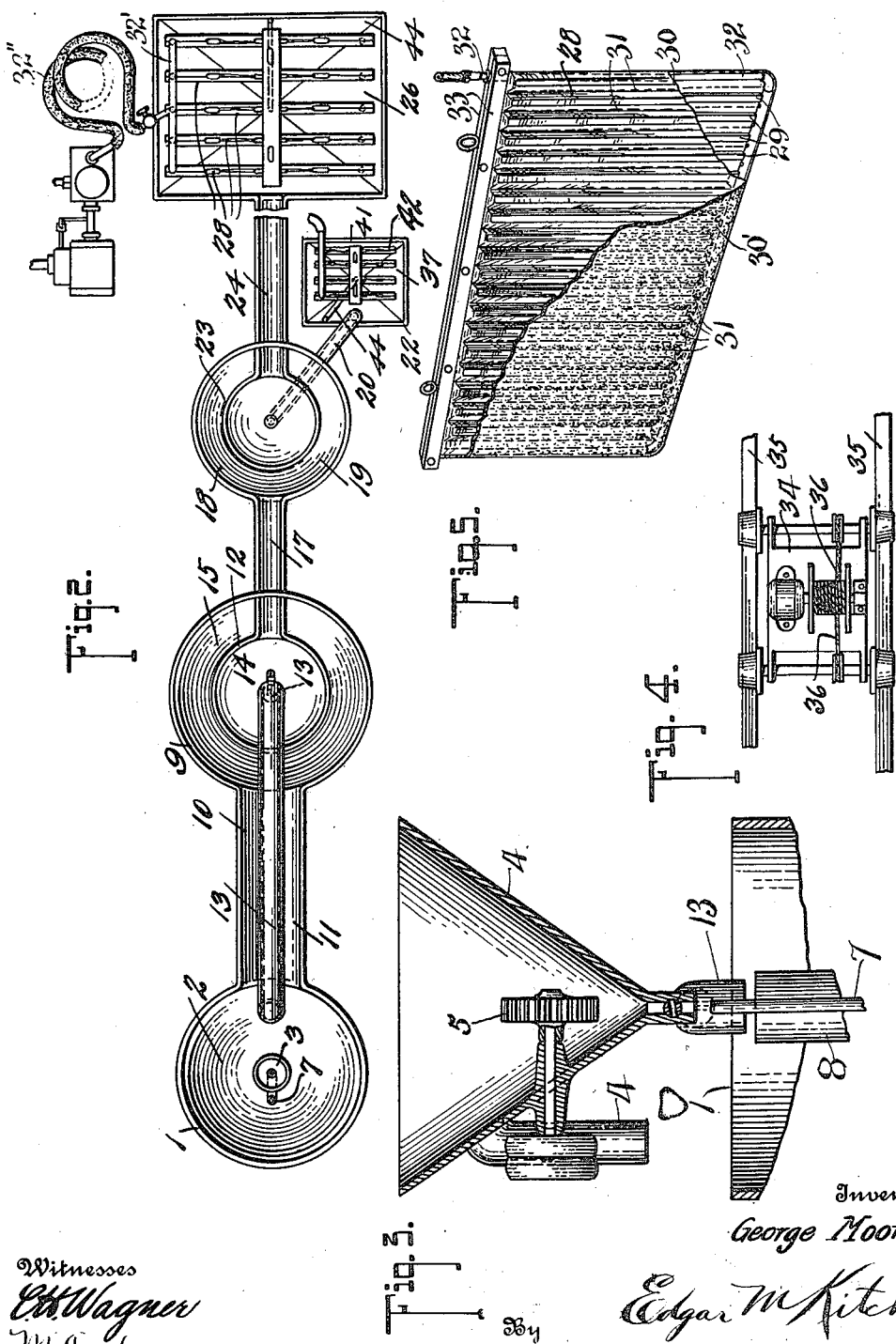

GEORGE MOORE, OF JOPLIN, MISSOURI, ASSIGNOR TO THE CHEMICAL PROCESS COMPANY, OF NEW YORK, N. Y., A CORPORATION OF NEW YORK.

SEWAGE TREATMENT.

1,271,926.     Specification of Letters Patent.     Patented July 9, 1918.

Application filed October 31, 1914. Serial No. 869,548.

*To all whom it may concern:*

Be it known that I, GEORGE MOORE, a citizen of the United States, residing at Joplin, in the county of Jasper and State of Missouri, have invented certain new and useful Improvements in Sewage Treatment, and I do hereby declare the following to be a full, clear, and exact description of the invention, such as will enable others skilled in the art to which it appertains to make and use the same.

This invention relates to improvements in the art of sewage disposal, and the primary object in view is the rapid and effective separation of solids including bacteria from liquid of sewage.

Another object is the increasing of the speed of separation by accelerating the formation of colloids by agitation of sewage in the presence of coagulated sewage solids.

A further object is the enhancing of the value of sewage solids while effecting the rapid formation of colloids by employing fuel solids in sewage as foreign matter assisting and hastening coagulation.

With these and further objects in view, as will in part hereinafter become apparent and in part be stated, the invention comprises certain novel steps and combinations of steps in the art of sewage disposal as will subsequently more fully appear.

In carrying out the steps of the process in detail in their preferred form and sequence, the employment of certain apparatus is desirable, and, for facility of disclosure, the form of such apparatus will be set forth specifically as delineated in the accompanying drawings, in which,—

Figure 1 is a view partly in side elevation and partly in vertical section.

Fig. 2 is a top plan view.

Fig. 3 is an enlarged detail fragmentary vertical section through the supply hopper.

Fig. 4 is a plan view of the crane.

Fig. 5 is an enlarged perspective view of one of the filter leaves detached, parts being broken away.

Referring to the drawings by numerals, 1 indicates an agitator tank having preferably a conical bottom 2, valved at 3, for facilitating cleaning of the tank when desired. A feed hopper 4 discharges into tank 1 and contains a disintegrator 5 consisting of a rotary shaft carrying agitating blades disposed for breaking up sludge within the hopper, the shaft being designed to be rotated by power supplied from any appropriate source not illustrated. A sewage supply pipe or trough 6 discharges into hopper 4, which in turn discharges into tank 1 through pipe 4'. An air jet 7 or other means of agitation is provided for tank 1, and preferably discharges upwardly in a centrally disposed pipe 8 for maintaining circulation of the contents of tank 1, and thus insuring effective agitation. Jet 7 is supplied with compressed air or other pressure fluid through a pipe leading from a source not illustrated.

A thickening tank 9 is arranged at one side of tank 1, and a trough 10 leads from tank 1 to tank 9. The trough 10 has a hopper-like enlargement 11 opening into tank 1 with the bottom of the enlargement inclined toward tank 1. An open-end quieting drum 12 is arranged within and concentric to and spaced from the walls of tank 9, and a sludge discharge pipe 13 is arranged preferably substantially centrally within drum 12, and extends from approximately the apex of the conical bottom 15 of tank 9 upwardly to a point above the drum 12 and is thence bent and extended across to and discharges into tank 1. An air jet 14 serves as a lift to force thickened solids commonly known as sludge, through pipe 13 back into tank 1. A valve 16 controls discharge from the bottom of tank 9 for enabling cleaning of the tank when desired.

A pipe or trough 17 leads from the upper end of drum 12 to a separator tank 18 spaced from tank 9 and having a conical bottom 19 valved at 20 for controlling discharge of sludge through a pipe 21 to a sludge tank 22. Pipe 21 is preferably flexible or otherwise adjustable for enabling easy control of the location of its discharge end.

A drum 23 is arranged within and concentric to the walls of tank 18 and spaced therefrom, and a pipe or trough 24 communicates with drum 23 and extends to and discharges into filter tank 25, having the hopper bottom 26 valved at 27 for enabling cleaning and draining.

Removably arranged in tank 25 is a filter 28 of the Moore filter leaf type, wherein a plurality of leaves discharge through a common header, and each leaf consists, as seen in Fig. 5, of a series of rods or strips of wood or other bars 29 inclosed in a canvas or other fabric covering 30, which fabric is stitched together between the bars by rows of stitching 31, the fabric also inclosing the discharge pipe 32 which extends about the lower and end edges of the leaf and forms the frame thereof in conjunction with the stiffening, preferably wooden, beams 33, 33, extending along the upper edge of the leaf and clamping the upper free edges of the fabric 30 together. The upper portion of pipe 32 extends through the beams 33, and one end of the pipe serves as the discharge for the leaf, being connected with the header 32', which header is connected by the flexible hose 32'' with a suction pump of any ordinary form, or the header may be otherwise connected to insure discharge and yet enable freedom of movement of the filter.

A crane 34 rides on tracks 35 arranged above tanks 25, 18, 9 and 1, and cables 36 connect filter 28 with crane 34 for facilitating elevation of the filter 28 above the tanks and movement thereof to a position above hopper 4 for discharging the collected cakes on filter 28 into the hopper and thence into tank 1. Sludge tank 22 has hopper bottom 37 valved at 38 to facilitate cleansing. A crane 39 is mounted on track 40 and connected by cables 41 with a filter 42 in tank 22, the filter 42 being a duplicate of filter 28 but usually of reduced size. Crane 39 is adapted to elevate filter 42 and to move the same to a point for discharging onto chute 43 which leads to a briquet machine or other appropriate point of disposal. Agitating air supply pipes 44 are arranged in tanks 25 and 22 for preventing settling of solids in the bottoms of the tanks.

In practising the process by the aid of the apparatus above described, tanks 1, 9 and 18 are filled with sewage. Foreign solids, such as coal dust or other solids preferably fuel, as charcoal or peat, are introduced into tank 1. Clay or sand might be employed with desirable results but they would not add to the calorific value of the final briquet. The supply of sewage being maintained through pipe 6 and hopper 4 to tank 1, and air being supplied to pipes 7, 14 and 44 under sufficient compression to agitate the contained sewage, the sewage and foreign solids flow from tank 1 to tank 9 where certain of the solids settle to the bottom of the tank and are picked up and returned to tank 1 through pipe 13, while certain portions of coagulated solids and liquid flow through conduit 17 to tank 18 where the solids are allowed to settle to the bottom. Drum 12 largely prevents agitation within tank 9 outside of the drum, so as to avoid discharge of heavier solids into conduit 17 due to agitation, and drum 23 largely prevents agitation therein incident to the flow to tank 18 through conduit 17. Thus only the most buoyant solids find their way into tank 25, the balance being disposed of through pipe 21 into tank 22. The heavier solids fall to the bottom of tank 18 and are drawn off through pipe 21 into the sludge tank. In this way, filter 28 is not clogged by an excessive mass of solids, but is left free for prolonged and rapid operation. The solids, finding their way to tank 25, are, however, so fine and adhesive that special provision is preferably made to prevent their collection against the fabric of the filter, since when so collected their removal becomes difficult, whereas, by applying a coating of coal dust, powdered charcoal, or like easily removed material, on the fabric first and forming a coating, as indicated at 30' in Fig. 3, and then filtering the effluent entering tank 25, the fine, sticky solids collect on the outer surface of the coat 30' and in no way interfere with the cleaning of the filter. Liquid is sucked or drawn by an appropriate aspirator, such as a hydraulic pump, through the filter beds or coatings 30', the fabric 30, and out through the header and to the pump, and thence discharged as perfectly clear effluent. This is continued until the sewage coating on the filter coatings 30' sufficiently obstruct the inflow of liquid as to render filtration slow. Thereupon, filter 28 is lifted from tank 25, and moved over hopper 4, and the cakes or filter beds 30' are discharged from the filter leaves into the hopper. To insure holding of these cakes or coatings 30' on the filter leaves during transit, the connection with the aspirator is maintained, and when the filter is in position for discharge, it is usually sufficient to relieve the suction and admit air to the interior of the filter leaves, whereupon the cakes or coatings 30' fall off and leave the fabric perfectly clean. In instances where the cakes fail to readily fall from the leaves, a reverse current, preferably of compressed air, is introduced through the header 32' to the interior of the filter leaves from a source not illustrated.

The filter 28 then again has its leaves supplied with coatings 30' which are applied preferably by introducing the filter into a tank containing slimes, such as would be obtained by discharging all sewage from tank 25 and filling the tank with water and then mixing coal dust, or powdered charcoal, or the like, in the water until the requisite consistency of slimes is produced, and then starting the aspirator for sucking water from the tank through the several filter leaves and building thereon cakes or filter bed coatings 30' formed of coal dust or other solids of the slimes. The fluid mass is constantly agitated during the buildings of the coatings 30' as by an air jet or jets arranged in the bottom or lower part of the tank. This method of applying the coatings is preferable because of its ease and speed, and also because one essential feature of the resulting coating is that they are uniform in consistency and in resistance to advance therethrough of filtrate at all points. One reason coatings of uniform resistance are assured when produced in this way resides in the fact that during the course of formation if a weak spot occurs, that is a point where the inflow is more easy than at any other point, the flow will be quickened at this point, and the slime solids will quickly fill in the weak spots and render it uniform in resistance with all other points, so that the resulting filter cake or coating offers substantially uniform permeability throughout.

The supply through pipe 16 is cut off while filter 28 is out of tank 25 and while being supplied with fresh filter bed coatings. When the leaves of filter 28 have been coated, the filter is lowered into tank 25, unless already therein incident to the employment of the tank in the coating operation, the supply of sewage effluent through conduit 24 is started by turning on the supply through pipe 6, and the filtration through filter 28 is also started and continues as before.

When the sewage solids collecting on coatings 30' in the form of almost impermeable, sticky and viscous films are sufficiently scant not to render the resulting mass too adhesive, the filter bed coatings may be blown off of the filter leaves while remaining in tank 25 and without an appreciable stop in the filtering operation, the reverse current being applied only for an instant and the aspirator then reapplied for causing a building of coating 30' of the mass within tank 25 on the filter leaves. When this is done, some of the filter solids are intermingled with the filter bed material, but the continuity of the film of sewage solids is broken up and the coating may be effectively employed thus until another film is formed of sufficient resistance to the inflow of liquid to undesirably slow down the filtering operation. Of course, whenever the coatings are found to adhere to the filter leaves to an undesirable degree, the coatings are delivered to hopper 4, and fresh coatings of foreign solids are formed on the filter leaves.

Ordinarily the foreign solids discharged from filter 28 into hopper 4 and thence into tank 1 are sufficient for all operative purposes and for compensating for removals of such solids with the sludge in tank 22, but if from any reason it appears at any time that additional foreign solids are desirable such solids are directly added by being deposited in tank 1.

The manipulations of filter 42 are effected the same as filter 28 except that ordinarily there is an ample supply of foreign solids in the sludge to cause the cakes formed on the filter leaves to be readily discharged.

If in working any sewage it becomes apparent that the cakes are not freeing themselves from the leaves of filter 42, said leaves will of course be supplied with coatings of foreign solids before filtration of sludge.

Obviously one of the most important objects to be attained in the handling of sewage is its rapid treatment without sacrifice of efficiency, and to this end the tank 1 is always supplied with the thickest solids from the sewage which, being returned from tank 9 and containing both coagulated sewage solids and foreign solids aids in causing coagulation of the sewage solids of incoming sewage, so that the product finally discharged through conduit 17 contains solids conditioned for more rapid settling and coagulation in tank 18 than could have been secured had not the sewage been subjected to intimate contact with other sewage solids and foreign solids such as occurs during agitation in tank 1.

The beneficial action of the agitation and circulation of sewage is due to the continuous change in relative position of coagulated solids with respect to each other and with respect to the gravity solids, that is, the foreign solids, whereby repeated contact is brought about and results in the particles attaching themselves to each other. This opportunity for contact and attachment would be very limited without circulation. When a light sewage solid or a colloid mass of sewage solids becomes attached to one or more of the foreign, gravity solids, the specific gravity of the mass is increased so as to produce rapid precipitation and coagulation.

No claim is herein made for the apparatus shown in the accompanying drawing since the invention involving the apparatus has been made the subject matter of my co-pending application Serial No. 869,547, filed October 31, 1914.

What I claim is:

1. In a process of the class described, agitating sewage in the presence of previously coagulated sewage solids, drawing off a portion from the agitated mass, returning coagulated solids of the drawn off portion to the mass, and agitating newly supplied sewage in the mass in the presence of the returned coagulated solids.

2. In a process of the class described, agitating sewage in the presence of previously coagulated sewage and foreign solids, drawing off a portion from the agitated mass, returning coagulated sewage and foreign solids from the drawn off portion to the mass, and agitating freshly supplied sewage in the mass in the presence of such returned sewage and foreign solids.

3. In a process of the class described, agitating sewage in the presence of previously coagulated sewage and fuel solids, drawing off a portion from the agitated mass, returning coagulated sewage and fuel solids from the drawn off portion to the mass, and agitating freshly supplied sewage in the mass in the presence of such returned sewage and fuel solids.

4. In a process of the class described, agitating sewage in the presence of previously coagulated sewage and fuel solids, drawing off a portion from the agitated mass, returning coagulated sewage and fuel solids from the drawn off portion to the mass, agitating freshly supplied sewage in the mass in the presence of such returned sewage and fuel solids, and treating unreturned portions for forming fuel of the solids therein contained.

5. In a process of the class described, as a continuous operation, maintaining agitation of a mass of sewage, previously coagulated sewage solids and foreign solids, continuously supplying thereto original sewage, drawing off therefrom fluid portions of the mass, returning to the mass solids from the drawn off portions, and filtering the remaining drawn off portions.

6. In a process of the class described, agitating sewage in the presence of foreign solids, drawing off fluid portions of the mass, filtering drawn off portions through a filter coat with filter bed material substantially the same as the foreign solids in the agitated mass, and delivering the coating of the filter into the agitating mass.

7. In a process of the class described, maintaining an inflowing supply of sewage to a mass of sewage while agitating the mass and maintaining an outflow of coagulated sewage solids and fluid from the mass to a second mass, maintaining a return flow of the heavier solids from the second mass back into the first mass, and disposing of the lighter portions of the second mass.

8. In a process of the class described, maintaining an inflowing supply of sewage to a mass of sewage and foreign solids while agitating the mass and maintaining an outflow of fluid and coagulated sewage and foreign solids from the mass to a second mass, maintaining a return flow of the heavier coagulated sewage and foreign solids from the second mass back into the first mass, and disposing of the lighter portions of the second mass.

9. In a process of the class described, agitating sewage in a mass, flowing portions of the mass into a second mass, returning heavier portions of the second mass to the first mass, separating the heavier from the lighter portions of the remaining portion of the second mass, and independently filtering the separated portions.

10. In a process of the class described, agitating sewage in a mass, flowing portions of the mass into a second mass, returning heavier portions of the second mass to the first mass, separating the heavier from the lighter portions of the remaining portion of the second mass, filtering one of such separated portions, and returning the solids thereof to the first mass.

11. In a process of the class described, agitating sewage in a mass, flowing portions of the mass into a second mass, returning heavier portions of the second mass to the first mass, separating the heavier from the lighter portions of the remaining portion of the second mass, filtering such separated lighter portion, and returning the solids thereof to the first mass.

12. In a process of the class described, maintaining an inflowing supply of sewage to a mass of sewage and foreign solids while agitating the mass and maintaining an outflow of fluid and coagulated sewage and foreign solids from the mass to a second mass, maintaining a return flow of the heavier coagulated sewage and foreign solids from the second mass back into the first mass, and filtering portions of the second mass and forming briquets of the solids thereof.

13. In a process of the class described, agitating sewage in a mass in the presence of foreign fuel solids, flowing parts of the agitating mass into a second mass, returning from the second mass to the first mass, heavier coagulated solids thereof, filtering remaining portions of the second mass, and briqueting solids thus separated.

14. In a process of the class described, agitating sewage in a mass in the presence of foreign fuel solids, flowing parts of the agitating mass into a second mass, returning from the second mass to the first mass heavier coagulated solids thereof, filtering remaining portions of the second mass, briqueting portions of the thus separated solids, and returning other portions thereof to the first mass.

In testimony whereof I affix my signature in presence of two witnesses.

GEORGE MOORE.

Witnesses:
R. M. PARKER,
EDGAR M. KITCHIN.